May 21, 1935.  D. S. EASTWOOD  2,002,224
GRINDING MACHINE
Filed Jan. 15, 1934
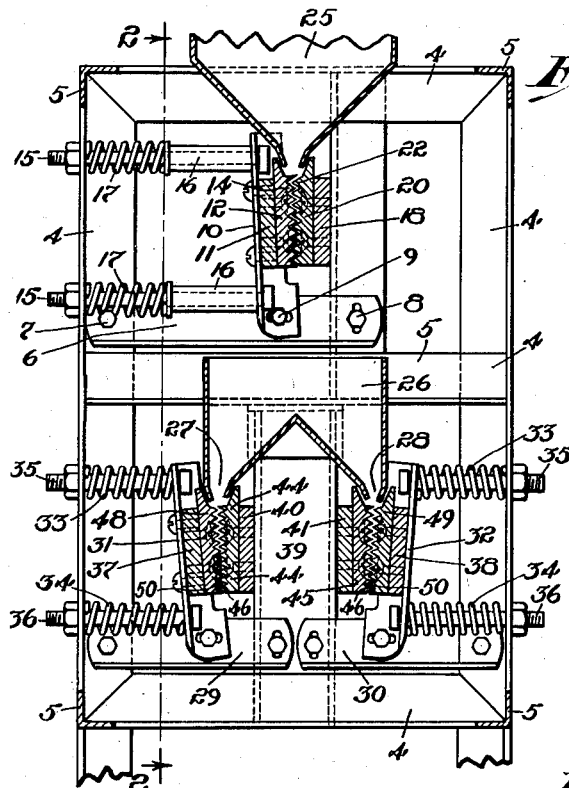
Fig.1
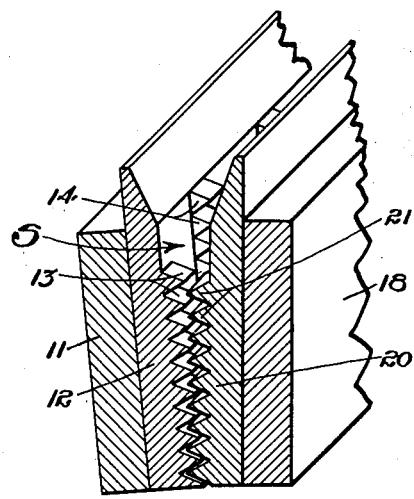
Fig.3
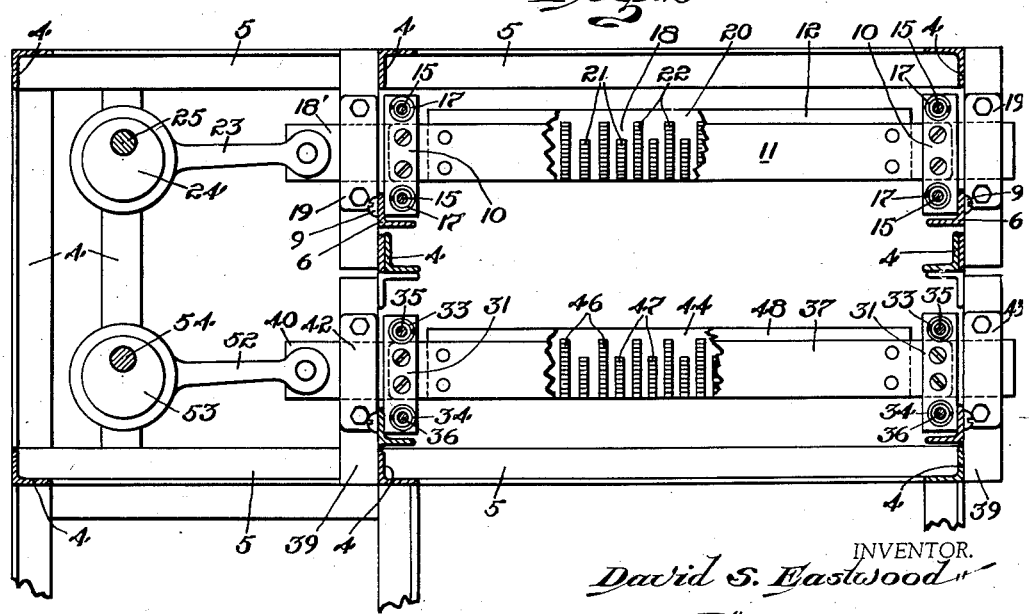
Fig.2
INVENTOR.
David S. Eastwood
BY
ATTORNEY.

Patented May 21, 1935

2,002,224

UNITED STATES PATENT OFFICE 2,002,224

GRINDING MACHINE

David S. Eastwood, Los Angeles, Calif.

Application January 15, 1934, Serial No. 706,638

5 Claims. (Cl. 83—10)

My invention relates to grinding machines, and more particularly to a machine designed for grinding coffee, grains and other articles, and while the mechanism can be constructed in larger and stronger manner for heavier work, I have chosen to illustrate in a mechanism suitable for grinding the smaller grains, such as coffee and the like.

Among the salient objects of my invention are: to provide a grinding machine having a pair of jaw body members having on their adjacent faces series of teeth, adapted to be moved into and out of mesh with each other by the horizontal reciprocation of one of said members relative to the other, said members being positioned in V-shape relationship to each other, whereby the grain or matter is fed into the device at the top and is worked downwardly between said members as one of said members is reciprocated horizontally relative to the other; to provide two V-shaped jaw body members having on their adjacent faces spaced tiers of teeth, alternate tiers being shorter, whereby to form a space between the upper ends of longer tiers and above the upper end of the intermediate shorter tier, said tiers being adapted to be moved horizontally relative to each other to move their teeth into and out of mesh with each other; to provide means for yieldingly supporting one of said members, whereby to give a yielding engagement of said members with each other in the grinding action with the material therebetween and as the teeth of one member are moved horizontally into and out of mesh with the teeth of another member; to provide in a grinding machine of the character referred to a plurality of grinding pairs arranged one above the other whereby the ground product from one grinding unit is fed therefrom down into another grinding unit below; and, in general, to provide an improved grinding machine which is simple, practical, efficient and which is operated by the horizontal reciprocation of one member relative to the other.

In order to explain my invention, I have illustrated the same on the accompanying sheet of drawing, which I will now describe;

Figure 1 is a vertical sectional view through a grinding machine embodying my invention;

Figure 2 is a vertical, longitudinal sectional view thereof taken at line 2—2 of Fig. 1, with portions broken out to show the tiers of teeth; and Figure 3 is an enlarged, fragmentary, perspective view of two of the jaw body members, showing the teeth on their adjacent faces.

Referring now in detail to the drawing, my grinding machine can be supported in any suitable frame structure. I have shown a frame structure of angle iron members, 4, 4, with cross connecting members 5, 5, forming a rectangular form of frame structure in which the grinding mechanism is mounted.

Referring first to the upper pair of grinding units, two supporting members 6, 6, are pivotally supported at their outer ends, as at 7, and adjustably supported at their inner ends by means of bolt and slot, as at 8, whereby one end of each can be adjusted up and down within short limits. Pivotally connected at their lower ends, as at 9, are two members 10, 10, also adjustable at the connection 9, on the supporting members 6, 6. Connected to these members 10, 10, and extending from one to the other, is a supporting bar 11, to which is secured a jaw member 12, having on its face tiers of teeth, 13 and 14, of different lengths, as will be understood from Figs. 2 and 3. In order that said bar 11, and jaw member 12, may be yieldingly supported, four bolts, as 15, are mounted in the frame and connected with the pivoted members 10, 10, with sleeves, as 16, thereon, and coiled springs, as 17, in the usual manner, whereby said bar 11 and jaw member 12 are yieldingly held for backward movement under pressure. Also mounted in the frame structure is another supporting bar 18, held in brackets 19, 19, for longitudinal reciprocation. On this bar is another jaw member 20, having tiers of teeth, as 21 and 22, in its inner face, positioned to mesh with the teeth 13 and 14 on the member 12, as seen in Fig. 3. The bar 18 is extended at one end, as at 18', Fig. 2, and has connected therewith a pitman 23, connected with an eccentric 24 at its outer end, on a shaft 25, by means of which said eccentric, pitman and bar 18 and jaw 20 are reciprocated.

A hopper 25 is mounted in the upper part of the frame, over the grinding elements and in position to feed the grain or material into the jaws of the grinding elements 12 and 20, and as the jaw 20 is reciprocated horizontally, the material is ground and fed downwardly gradually and discharged out at the lower edge of said grinding elements. A second hopper structure 26 is mounted in said frame structure, under said grinding elements 12 and 20, said second hopper being shown as having two discharge outlets, as 27 and 28, to other grinding elements similar to those described and situated above said hopper structure 26.

In the lower part of the frame structure, at opposite ends thereof, are two pairs of the pivoted supporting bars, designated 29 and 30, and to which are pivotally connected the jaw-supporting members, as 31 and 32, yieldingly held in place by means of coiled springs 33 and 34 on bolts 35 and 36, in a manner readily understood from the showing. Jaw supporting bars, as 37 and 38, extending lengthwise of the structure, and are secured at their ends to the members 31 and 32, respectively, it being understood that at each end of each bar 37 and 38, is a yieldingly mounted supporting member, as 31 and 32, shown in Fig. 1 in particular.

Mounted on the opposite sides or edges of channel frame members 39, there being one at each end of the frame structure, are two jaw supporting bars, 40 and 41, supported at their opposite ends through suitable brackets, as 42 and 43, whereby said bars can be reciprocated lengthwise, said brackets being seen in Fig. 2. On these bars 40 and 41, respectively, are the jaw members, 44 and 45, having the alternating long and short tiers of teeth, designated, respectively 46 and 47, similar to what is illustrated in enlarged form in Fig. 3. On the supporting bars 37 and 38, are secured the companion jaw members, 48 and 49, having also the corresponding long and short tiers of teeth, 50 and 51. The alternate short and long tiers of teeth on the inner or adjacent faces of the jaw members, also provides receiving spaces or pocket-like places for the grain to rest in while it is being gradually worked down through the teeth. The jaw supporting bars 40 and 41, with their jaws, are reciprocated longitudinally, as by means of the pitman 52, on the eccentric 53, on shaft 54.

Thus I have shown an upper unit or pair of grinding jaws, to receive matter from a hopper 25, and to grind it and move it downwardly and discharge it into a hopper structure 26, from which said ground matter can be discharged into two companion grinding units below and which have just been described. These grinding units are all similar and each constitutes two jaw members of any desired length, provided on their inner or adjacent faces with tiers of saw-teeth grinding elements arranged to interfit substantially as shown so that as one of said members is reciprocated longitudinally, the tiers of teeth will be moved laterally into and out of grinding relationship with each other and so as to grind or shear the matter being ground as it is caught between the edges of the teeth of said jaws.

It will be understood, of course, that both jaws of each pair can be reciprocated, but I have shown only one of each pair so mounted, and have shown the other jaw of each pair yieldingly supported so as to yield in case of any strain or overload between the grinding teeth or jaws.

By providing alternate long and short tiers of teeth on the jaw members, as shown clearly in Figs. 2 and 3, spaces, similar to that designated at S, are provided to facilitate the distribution and feed of the material down into the teeth.

Any suitable power can be used for reciprocating the jaw members mounted for that purpose, and it will also be understood that any suitable frame or supporting structure can be used. My invention is involved in the grinding elements, that is, the longitudinally movable jaw members having the tiers of teeth thereon in cooperation with other similar jaw members having similar tiers of teeth thereon, whereby the tiers of teeth are moved laterally of the tiers, the teeth of one tier moving into and out of grinding or cutting relationship with the teeth of another tier.

I do not, therefore, limit my invention to the particular construction and arrangement shown and described for illustrative purposes, except as I may be limited by the hereto appended claims.

I claim:

1. In a grinding machine, two jaw members horizontally disposed adjacent each other, each having on its inner face, spaced longitudinally of said jaw member, tiers of teeth projecting between said jaw members and adapted to be moved laterally relative to each other, in interfitting relationship, as one jaw member is moved back and forth lengthwise, and means for reciprocating one of said jaw members, whereby matter passing downwardly between said jaw members is ground by said teeth.

2. In a grinding machine, two jaw members horizontally disposed and having on their adjacent faces, spaced longitudinally thereof, tiers of teeth projecting from said adjacent faces, said teeth being in overlapping relationship to each other as said jaw members are brought together face to face, and means for reciprocating one of said jaw members longitudinally, whereby the teeth in the tiers on one jaw member move laterally back and forth between the teeth of the tiers of the other jaw member.

3. In a grinding machine, a pair of jaw members horizontally positioned with their faces adjacent each other in V-shape cooperative relationship, said jaw members having on their adjacent faces spaced tiers of teeth projecting therefrom, whereby the tiers of teeth on one jaw member intermesh with the tiers of teeth of the other jaw member for lateral reciprocation, means for reciprocating one of said jaw members longitudinally to move its tiers of teeth laterally into and out of mesh with the tiers of teeth of the other jaw member, and means for feeding matter to be ground downwardly between said jaw members.

4. In a grinding machine, a pair of jaw members horizontally positioned with their faces adjacent each other in cooperative relationship, said jaw members having on their adjacent faces teeth projecting therefrom, whereby the teeth of one jaw member intermesh with the teeth of the other jaw member, one of said jaw members being yieldingly supported to be moved yieldingly toward and from the other jaw member facewise, the other of said jaw members being mounted to be reciprocated longitudinally relative to the first jaw member, and means for reciprocating said jaw member, the teeth of said members being of saw-teeth form spaced longitudinally to form vertical tiers and interfitting as said member is reciprocated laterally.

5. In a grinding machine, two jaw members supported face to face in V-relationship and being horizontally disposed lengthwise, said members having on their adjacent faces vertical tiers of teeth projecting therefrom, each tooth being tapered to an edge positioned lengthwise of said jaw member, said tiers of teeth being spaced longitudinally of said jaw members, whereby said teeth can be moved laterally into and out of mesh with each other and from one tier to another, as one of said jaw members with its tiers of teeth are reciprocated longitudinally of said jaw member, and means for feeding matter to be ground between said jaw members as said jaw member is reciprocated, and means for reciprocating said jaw member longitudinally.

DAVID S. EASTWOOD.